United States Patent [19]
Min

[11] Patent Number: 5,886,811
[45] Date of Patent: Mar. 23, 1999

[54] THIN FILM ACTUATED MIRROR ARRAY IN AN OPTICAL PROJECTION SYSTEM AND METHOD FOR MANUFACTURING THE SAME

[75] Inventor: Yong-Ki Min, Seoul, Rep. of Korea

[73] Assignee: Daewoo Electronics Co., Ltd., Rep. of Korea

[21] Appl. No.: 941,190

[22] Filed: Sep. 30, 1997

[30] Foreign Application Priority Data

Feb. 27, 1997 [KR] Rep. of Korea .......................... 97-6131

[51] Int. Cl.⁶ ............................. G02B 26/00; G02B 26/08
[52] U.S. Cl. ......................... 359/291; 359/224; 359/295; 359/318; 359/846
[58] Field of Search ................................... 359/212, 224, 359/290, 291, 295, 318, 850, 855, 846

[56] References Cited

U.S. PATENT DOCUMENTS

| | | | |
|---|---|---|---|
| 4,954,789 | 9/1990 | Sampsell | 359/291 |
| 5,126,836 | 6/1992 | Um | 358/60 |
| 5,469,302 | 11/1995 | Lim | 359/846 |
| 5,604,623 | 2/1997 | Ji et al. | 359/855 |
| 5,610,773 | 3/1997 | Min | 359/850 |

FOREIGN PATENT DOCUMENTS

| | | |
|---|---|---|
| 0 653 657 | 5/1995 | European Pat. Off. . |
| 0 671 645 A2 | 9/1995 | European Pat. Off. . |
| 0 671 645 A3 | 9/1995 | European Pat. Off. . |
| 2 314 939 | 1/1998 | United Kingdom . |
| 96/33434 | 10/1996 | WIPO . |

*Primary Examiner*—Georgia Epps
*Assistant Examiner*—Margaret Burke
*Attorney, Agent, or Firm*—Pillsbury Madison & Sutro, LLP

[57] ABSTRACT

Thin film AMA has a substrate having electrical wiring and a connecting terminal, an actuator formed on the substrate, a supporting element formed between the substrate and the actuator for supporting the actuator, a reflecting member formed on the actuator, and a plurality of posts formed between the actuator and the reflecting member for supporting the reflecting member. The reflecting member is supported by a first post formed on the actuator and by a second post and a third post correspondingly formed on an actuator adjacent to the actuator. So, a deflection or tilting downward of the reflecting member can be prevented so that tilting angle of the reflecting members can be made uniform. Further, as the length of the reflecting member between the first post and the second post, or between the first post and the third post is shorter, the tilting angle of the reflecting member is bigger.

20 Claims, 15 Drawing Sheets

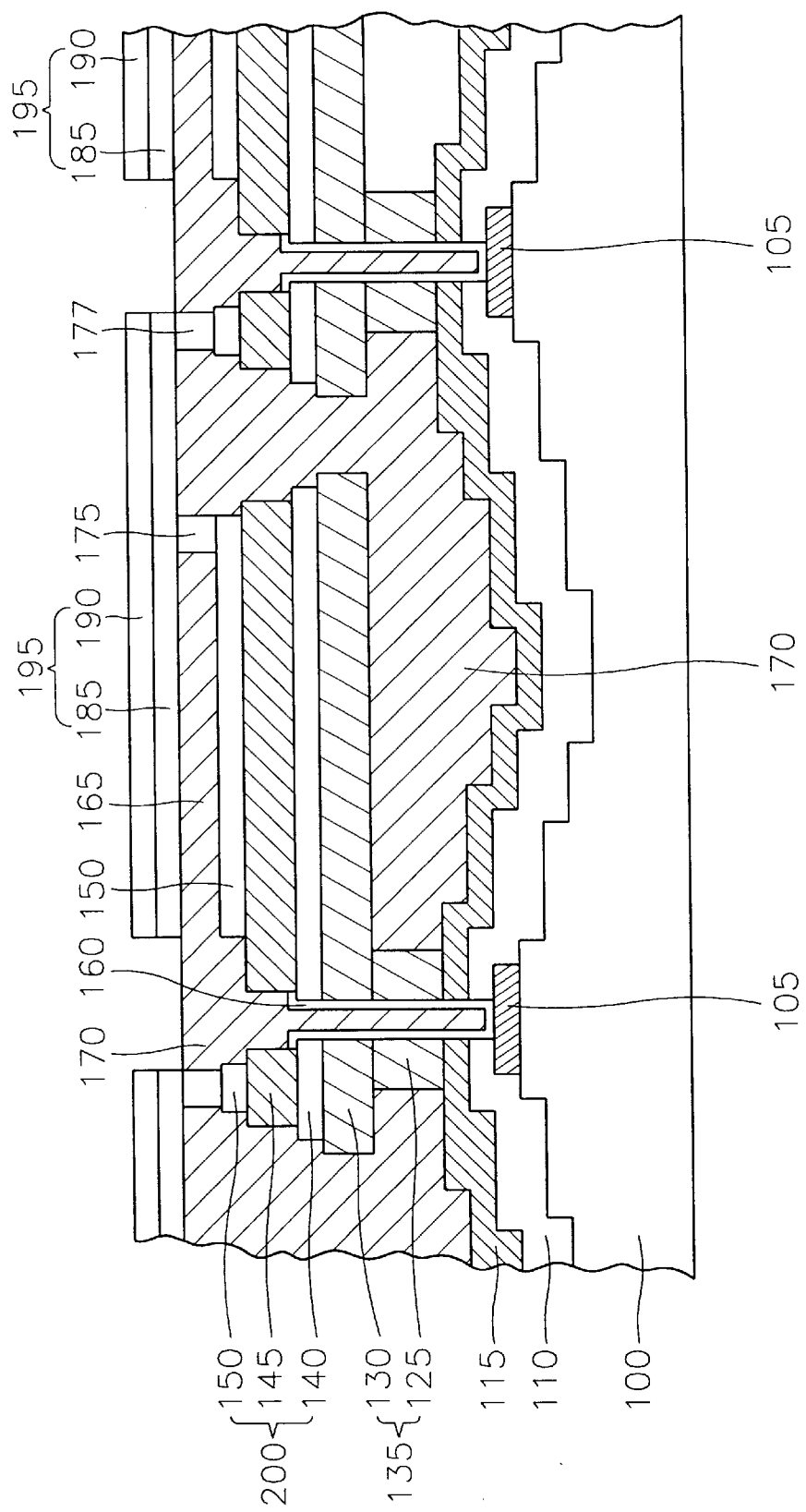

THIN FILM ACTUATED MIRROR ARRAY IN AN OPTICAL PROJECTION SYSTEM AND METHOD FOR MANUFACTURING THE SAME

BACKGROUND OF THE INVENTION

The present invention relates to a thin film actuated mirror array in an optical projection system and to a method for manufacturing the same, and more particularly to a thin film actuated mirror array in an optical projection system having a plurality of posts between an actuator and a reflecting member so as to prevent an initial deflection or a tilt of the reflecting member, thereby making a tilting angle of the reflecting member uniform and bigger, and to a method for manufacturing the same.

In general, light modulators are divided into two groups according to their optics. One type is a direct light modulator such as a cathode ray tube (CRT). The other type is a transmissive light modulator such as a liquid crystal display (LCD). The CRT produce superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2% due to light polarization. Also, there are some problems in the liquid crystal materials of the LCD such as sluggish response and overheating.

Thus, a digital mirror device (DMD) and actuated mirror arrays (AMA) have been developed in order to solve these problems. Currently, the DMD has a light efficiency of about 5%, but the AMA has a light efficiency of above 10%. The AMA enhances the contrast of a picture on a screen, so the picture on the screen is more apparent and brighter. The AMA is not affected by and does not affect the polarization of light and therefore, the AMA is more efficient than the LCD or the DMD.

FIG. 1 shows a schematic diagram of an engine system of a conventional AMA which is disclosed in U.S. Pat. No. 5,126,836 (issued to Gregory Um). Referring to FIG. 1, a ray of incident light from a light source 1 passes a first slit 3 and a first lens 5 and is divided into red, green, and blue lights according to the Red-Green-Blue (R·G·B) system of color representation. After the divided red, green, and blue lights are respectively reflected by a first mirror 7, a second mirror 9, and a third mirror 11, the reflected light is respectively incident on AMA devices 13, 15, and 17 corresponding to the mirrors 7, 9, and 11. The AMA devices 13, 15, and 17 tilt mirrors installed therein, so the incident light is reflected by the mirrors 7, 9, and 11. In this case, the mirrors 7, 9, and 11 installed in the AMA devices 13, 15, and 17 are tilted according to the deformation of active layers formed under mirrors. The lights reflected by the AMA devices 13, 15, and 17 pass a second lens 19 and a second slit 21 and form a picture on a screen (not shown) by using projection lens 23.

The AMA is generally divided into a bulk type AMA and a thin film type AMA. The bulk type AMA is disclosed in U.S. Pat. No. 5,469,302 (issued to Dae-Young Lim). In the bulk type AMA, after a ceramic wafer which is composed of multilayer ceramics inserted into metal electrodes therein is mounted on an active matrix having transistors, a mirror is mounted on the ceramic wafer by means of sawing the ceramic wafer. However, the bulk type AMA has disadvantages in that it demands a very accurate process and design, and the response of an active layer is slow. Therefore, the thin film AMA manufactured by using semiconductor technology has been developed.

The thin film AMA is disclosed in U.S. Ser. No. 08/336,021 U.S. Pat. No. 5,760,947, entitled "THIN FILM ACTUATED MIRROR ARRAY USED IN AN OPTICAL PROJECTION SYSTEM AND METHOD FOR THE MANUFACTURE THEREOF," which is now pending in USPTO and is subject to an obligation to the assignee of this application.

FIG. 2 shows a cross-sectional view of the thin film AMA. Referring to FIG. 2, the thin film AMA has an active matrix 31, an actuator 33 formed on the active matrix 31, and a mirror 35 installed on the actuator 33. The active matrix 31 has a substrate 37, M×N (in which M, N is integers) number of transistors (not shown) which are installed in the substrate 37, and M×N (in which M, N is integers) number of connecting terminals 39 respectively formed on the transistors.

The actuator 33 has a supporting member 41 formed on the active matrix 31 which includes connecting terminal 39, a first electrode 43 having a bottom of first portion thereof attached to the supporting member 41 and having a second portion formed parallel to the active matrix 31, a conduit 49 formed in the supporting member 41 so as to connect connecting terminal 39 to the first electrode 43, an active layer 45 formed on the first electrode 43, a second electrode 47 formed on the active layer 45, a spacing member 51 formed at first portion of the second electrode 47, and a supporting layer 53 having a bottom of first portion thereof attached to the spacing member 51 and having a second portion formed parallel to the second electrode 47. The mirror 35 is installed on the supporting layer 53.

A manufacturing method of the thin film AMA will be described below. FIGS. 3A to 3D illustrate manufacturing steps of the thin film AMA. In FIGS. 3A to 3D, the same reference numerals are used for the same elements in FIG. 2.

Referring to FIG. 3A, at first, the active matrix 31 which includes the substrate 37 in which M×N number of transistors (not shown) are formed and M×N number of connecting terminals 39 respectively formed on the transistors is provided. Subsequently, after a first sacrificial layer 55 is formed on the active matrix 31, the first sacrificial layer 55 is patterned to expose a portion of the active matrix 31 where the connecting terminal 39 is formed. The first sacrificial layer 55 can be removed by using an etching method or by means of chemicals.

Referring to FIG. 3B, the supporting member 41 is formed on the exposed portion of the active matrix 31 by a sputtering method or a chemical vapor deposition (CVD) method. Next, after a hole is formed through supporting member 41, the conduit 49 is formed in the supporting member 41 by filling the hole with an electrically conductive material, for example tungsten (W). The conduit 49 electrically connects the connecting terminal 49 to the first electrode 43 which is successively formed. The first electrode 43 is formed on the supporting member 41 and on the first sacrificial layer 55 by using an electrically conductive material such as gold (Au) or silver (Ag). The active layer 45 is formed on the first electrode 43 by using a piezoelectric material, for example lead zirconate titanate (PZT). The second electrode 47 is formed on the active layer 45 by using an electrically conductive material such as gold (Au) or silver (Ag).

The transistor installed in the active matrix 31 converts a picture signal which is caused by an incident light from a light source into a signal current. The signal current is applied to the first electrode 43 through the connecting terminal 39 and the conduit 49. At the same time, a bias current from outside through a common line (not shown) formed on the bottom of the active matrix 31 is applied to the second electrode 47, so an electric field is generated between the second electrode 47 and the first electrode 43. The active layer 45 formed between the second electrode 47 and the first electrode 43 is actuated according to the electric field.

Referring to FIG. 3C, after a second sacrificial layer 57 is formed on the second electrode 47, the second sacrificial layer 57 is patterned to expose a portion of the second electrode 47 adjacent to a portion under which the supporting member 41 is formed. After the spacing member 51 is formed at the exposed portion, the supporting layer 53 is formed on the second sacrificial layer 57 and on the spacing member 51. Also, the mirror 35 for reflecting the incident light is formed on the supporting layer 53.

Referring to FIG. 3D, the mirror 35, the supporting layer 53, the second electrode 47, the active layer 45 and the first electrode 43 are sequentially patterned so that M×N number of pixels having predetermined shapes are formed. Consequently, after the first sacrificial layer 55 and the second sacrificial layer 57 are removed, pixels are rinsed and dried in order to complete the thin film AMA.

To However, in the above-described thin film AMA, as a first portion of the mirror is supported by a spacing member formed on the actuator, a second portion of the mirror which is not supported by the spacing member may deflect or tilt downward. So, the tilting angles reflected by every reflecting member are not uniform. Therefore, the light efficiency of the light reflected by the reflecting member is decreased and the contrast of the picture projected onto a screen is also decreased. In addition, the distance between the light source and the screen is narrower due to the limited tilting angle of the actuator.

SUMMARY OF THE INVENTION

Accordingly, considering the problems as described above, it is a first object of the present invention to provide a thin film actuated mirror array in an optical projection system having a plurality of posts between an actuator and a reflecting member so as to prevent an initial deflection or a tilt of the reflecting member, thereby making a tilting angle of the reflecting member uniform and bigger.

Also, it is a second object of the present invention to provide a method for manufacturing the above thin film actuated mirror array in an optical projection system.

To accomplish the above first object, there is provided in the present invention a thin film actuated mirror array in an optical projection system actuated by a first signal and a second signal. The thin film actuated mirror array has a substrate, an actuator formed on the substrate, a supporting element formed between the substrate and the actuator for supporting the actuator, a reflecting member formed on the actuator and a plurality of posts formed between the actuator and the reflecting member for supporting the reflecting member.

The substrate has electrical wiring and a connecting terminal for receiving the first signal from outside and transmitting the first signal.

The supporting element has a supporting member formed on the substrate where the connecting terminal is formed and a first supporting layer. The first supporting layer has a first portion attached to the supporting member and a second portion parallely formed to the substrate.

The actuator has a bottom electrode for receiving the first signal, a top electrode corresponding to the bottom electrode for receiving the second signal and generating an electric field between the top electrode and the bottom electrode, and an active layer formed between the top electrode and the bottom electrode and deformed by the electric field.

A first post is formed on a first portion of the actuator. A second post and a third post are formed on an actuator adjacent to the actuator where the supporting member is formed. The third post is formed corresponding to the second post.

A reflecting member for reflecting a light is supported by the first post, the second post and the third post.

The actuator may have a 'U' shape. At this time, the first post is formed in the middle of the first portion of the actuator. The second post and the third post are correspondingly formed on both ends of the adjacent actuator having a 'U' shape.

Preferably, the first post, the second post and the third post are respectively formed by using an elastic material.

The first post may be formed in the middle of the first portion of the actuator and the second post and the third post may be formed corresponding to each other on both ends of the adjacent actuator. In such a manner, the first post, the post and the third post are respectively located on the apexes of a triangle.

A cross-sectional view of the first post, the second post and the reflecting member has an 'F' shape and a cross-sectional view of the first post, the third post and the reflecting member has an 'F' shape.

The preferred length of the reflecting member between the first post and the second post is shorter than that of the reflecting member between the first post and an end of the reflecting member. Also, the preferred length of the reflecting member between the first post and the third post is shorter than that of the reflecting member between the first post and an end of the reflecting member.

The reflecting member may further comprise a second supporting layer supported by the first post, the second post and the third post and a reflecting layer formed on the second supporting layer for reflecting a light. The second supporting layer enhances a flatness of the reflecting member.

In order to accomplish the above second object, there is provided in the present invention a method for manufacturing a thin film actuated mirror array in an optical projection system actuated by a first signal and a second signal. The method for manufacturing the thin film actuated mirror array in an optical projection system comprises the steps of:

providing a substrate having electrical wiring and a connecting terminal for receiving the first signal from outside and transmitting the first signal;

forming a first sacrificial layer on the substrate and patterning the first sacrificial layer to expose a portion of the substrate where the connecting terminal is formed;

forming a first layer on the exposed substrate and on the first sacrificial layer;

forming a bottom electrode layer, a second layer and a top electrode layer successively on the first layer;

forming an actuator by patterning the top electrode layer to form a top electrode for receiving the second signal and generating an electric field, by patterning the second layer to form an active layer deformed by the electric field, and by patterning the bottom electrode layer to form a bottom electrode for receiving the first signal;

forming a supporting element by patterning the first layer to form a first supporting layer beneath the bottom electrode, and by forming a supporting member under a first portion of the first supporting layer;

forming a second sacrificial layer on the actuator and on an actuator adjacent to the actuator and patterning the second sacrificial layer to expose a first portion of the actuator and to expose portions of the adjacent actuator correspondingly where the supporting member is formed;

forming a first post in the exposed first portion of the actuator;

forming a second post and a third post in the exposed portions of the adjacent actuator; and forming a reflecting member on the first post, the second post, the third post and the second sacrificial layer for reflecting a light.

The steps of forming the first post, the second post and the third post may be concurrently performed.

The step of forming the reflecting member may further comprise the step of forming a second supporting layer on the first post, the second post, the third post and the second sacrificial layer, forming a reflecting layer on the second supporting layer, patterning the reflecting layer and the second supporting layer, and removing the second sacrificial layer.

The step of forming the second supporting layer is performed by using nitride or metal and by a sputtering method or a chemical vapor deposition method. Preferably, the step of removing the second sacrificial layer is performed by an oxygen plasma method.

In the thin film AMA according to the present invention, the first signal, which is the picture signal, is applied to the bottom electrode via the electrical wiring, the connecting terminal and a via contact. At the same time, the second signal, which is the bias signal, is applied to the top electrode from outside through the common line. Thus, an electric field is generated between the top electrode and the bottom electrode. An active layer, which is formed between the top electrode and the bottom electrode, is deformed by such an electric field.

The active layer is deformed in a direction perpendicular to the electric field. The actuator having the active layer is actuated upward by a predetermined tilting angle. The reflecting member for reflecting an incident light from a light source tilts with the actuator because the reflecting member is formed on the actuator. So, the reflecting member reflects the incident light from a light source by a predetermined tilting angle, and the light reflected by the reflecting member passes a slit and forms a picture on a screen. At this time, as the length of the reflecting member between the first post and the second post, or between the first post and the third post is shorter, the tilting angle of the reflecting member is bigger. Hence, the light efficiency of the light reflected by the reflecting member increases because the tilting angles reflected by every reflecting member are uniform, thereby increasing the contrast of the picture projected onto a screen.

Therefore, the thin film AMA in an optical projection system according to the present invention has a first post, a second post and a third post between an actuator and a reflecting member so as to prevent an initial deflection or a tilt of the reflecting member, thereby making a tilting angle of the reflecting member uniform. Furthermore, the distance between the light source and the screen is wider because the tilting angle of the reflecting member is bigger.

BRIEF DESCRIPTION OF THE DRAWINGS

The above objects and advantages of the present invention will become more apparent by describing in detail preferred embodiments thereof with reference to the attached drawings, in which:

FIGS. 6A to 6F illustrate manufacturing steps of the thin film AMA in an optical projection system illustrated in FIG. 5;

DETAILED DESCRIPTION OF THE INVENTION

Hereinafter, the preferred embodiments of the present invention will be explained in more detail with reference to the accompanying drawings.

Figure 1:
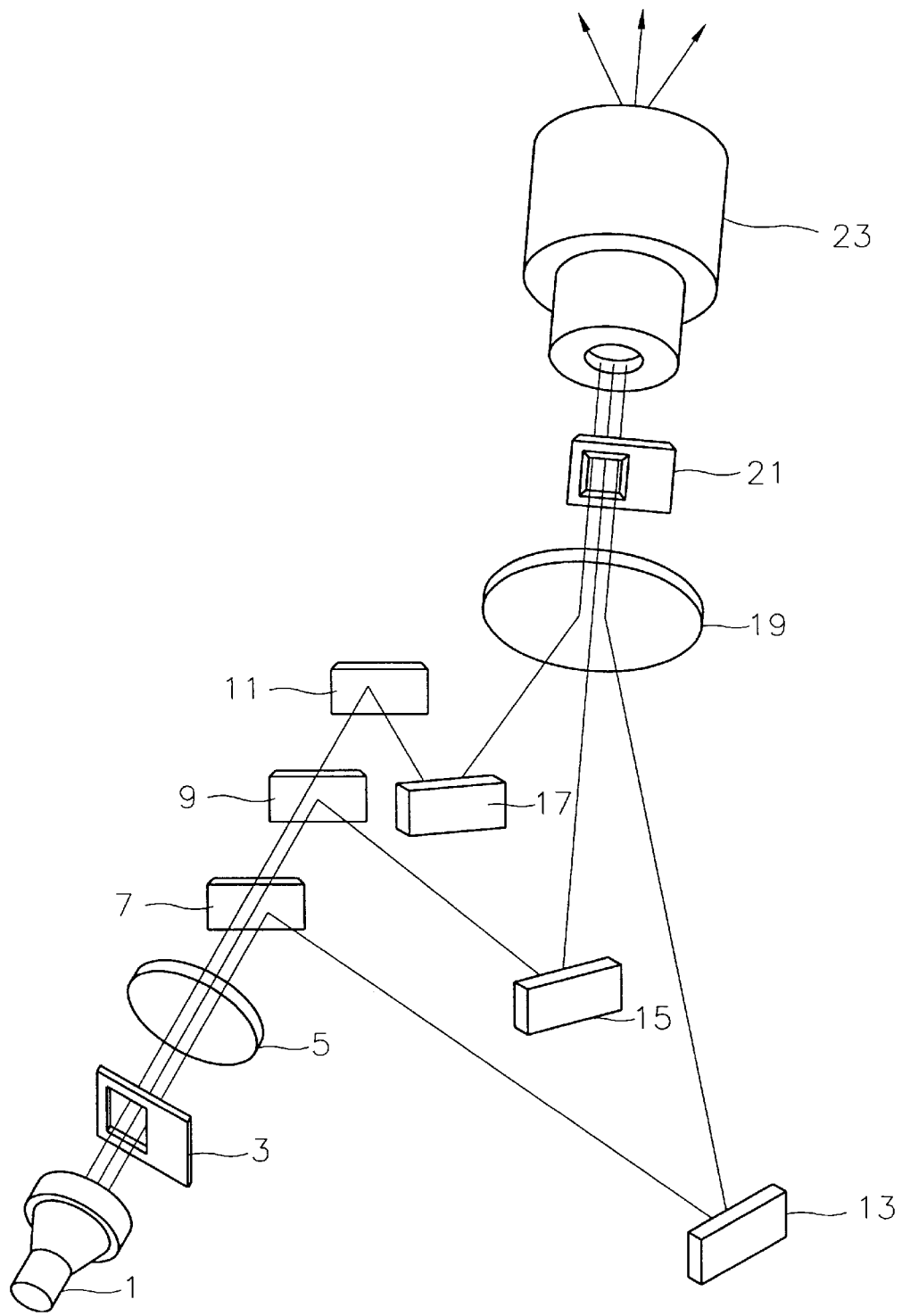
FIG. 1 is a schematic view for showing an engine system of a conventional AMA.
Figure 2:
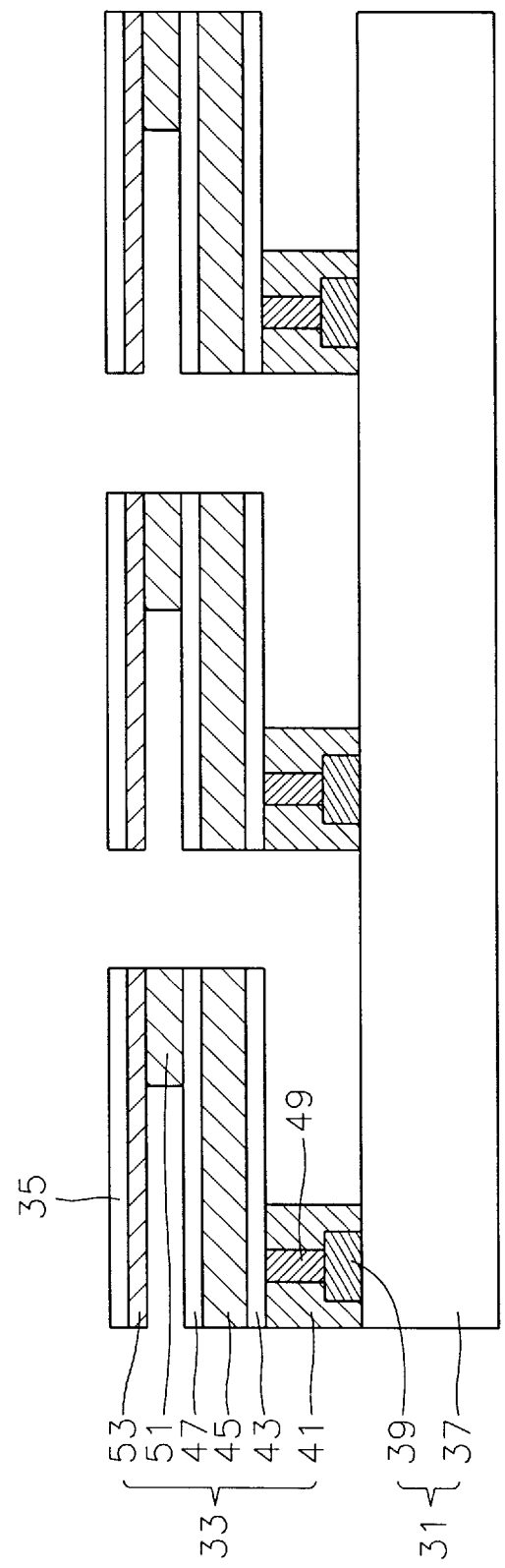
FIG. 2 is cross-sectional view for showing a thin film AMA described in a prior application of the assignee of this application.
Figure 3A:
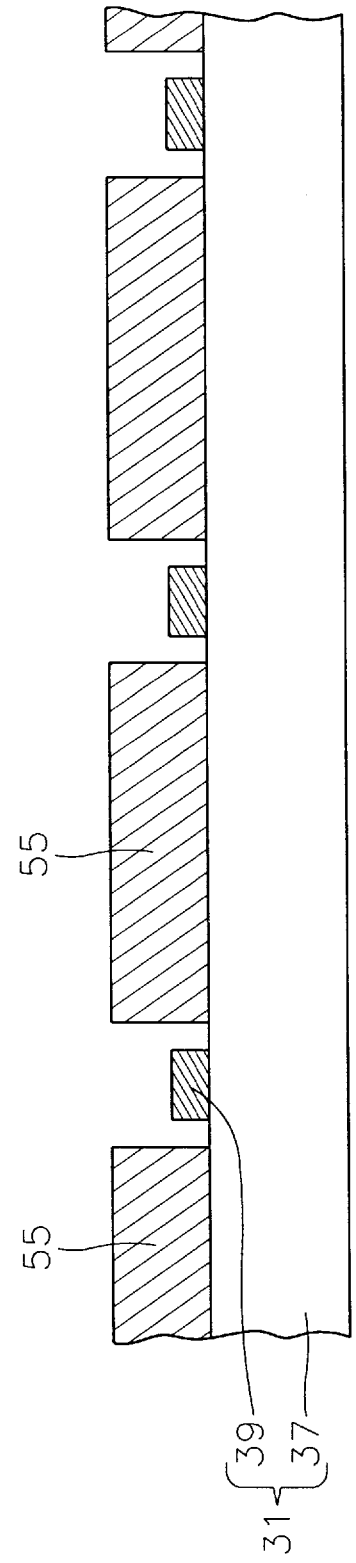
FIGS. 3A to 3D illustrate manufacturing steps of the thin film AMA illustrated in FIG. 2.
Figure 3B:
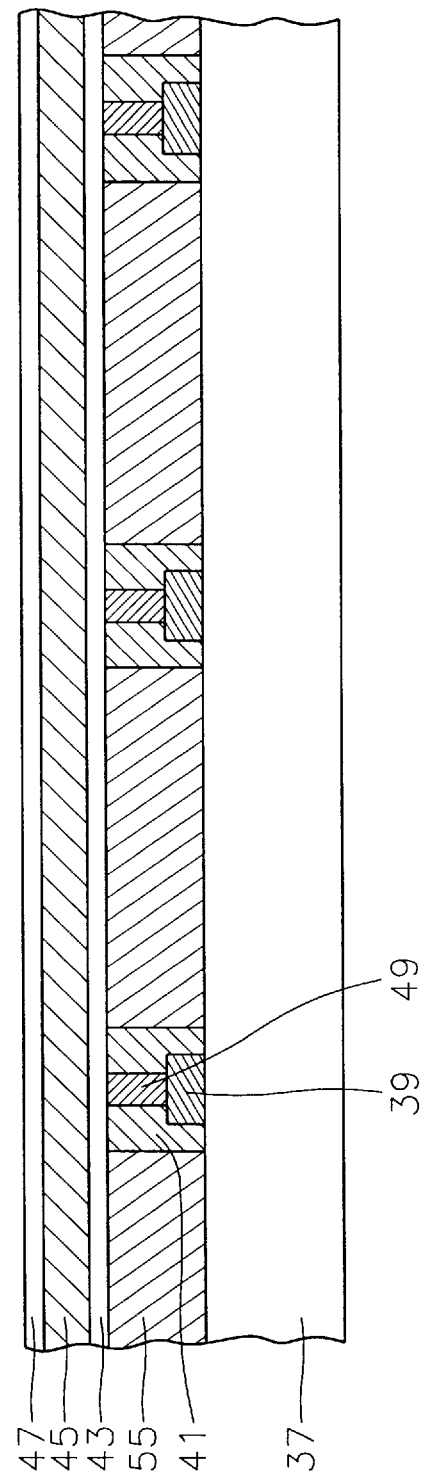
Figure 3C:
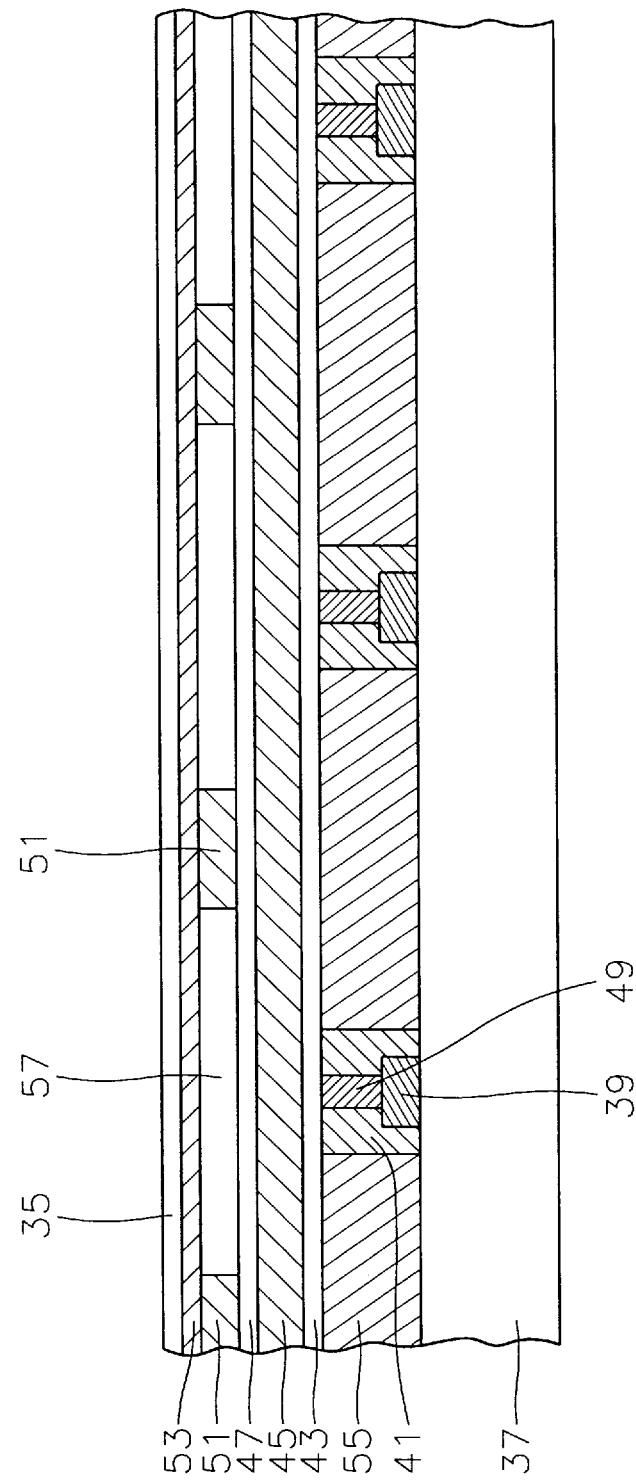
Figure 3D:
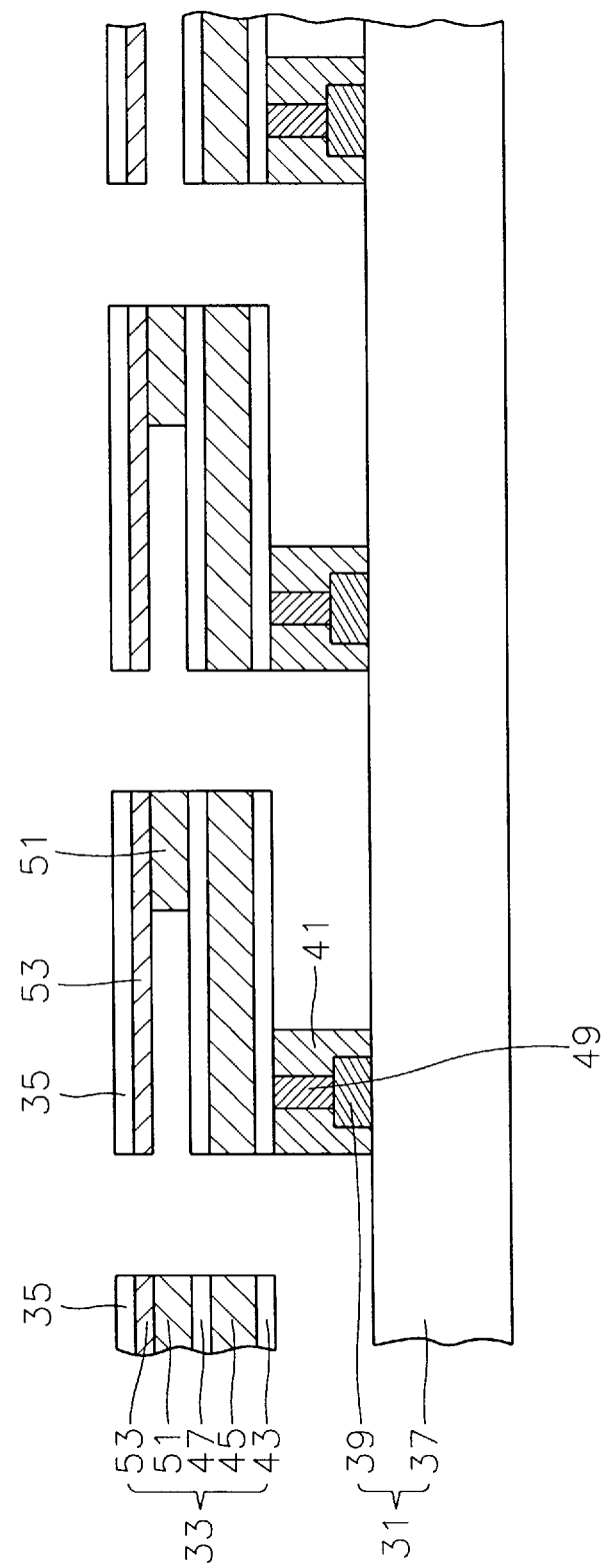
Figure 4:
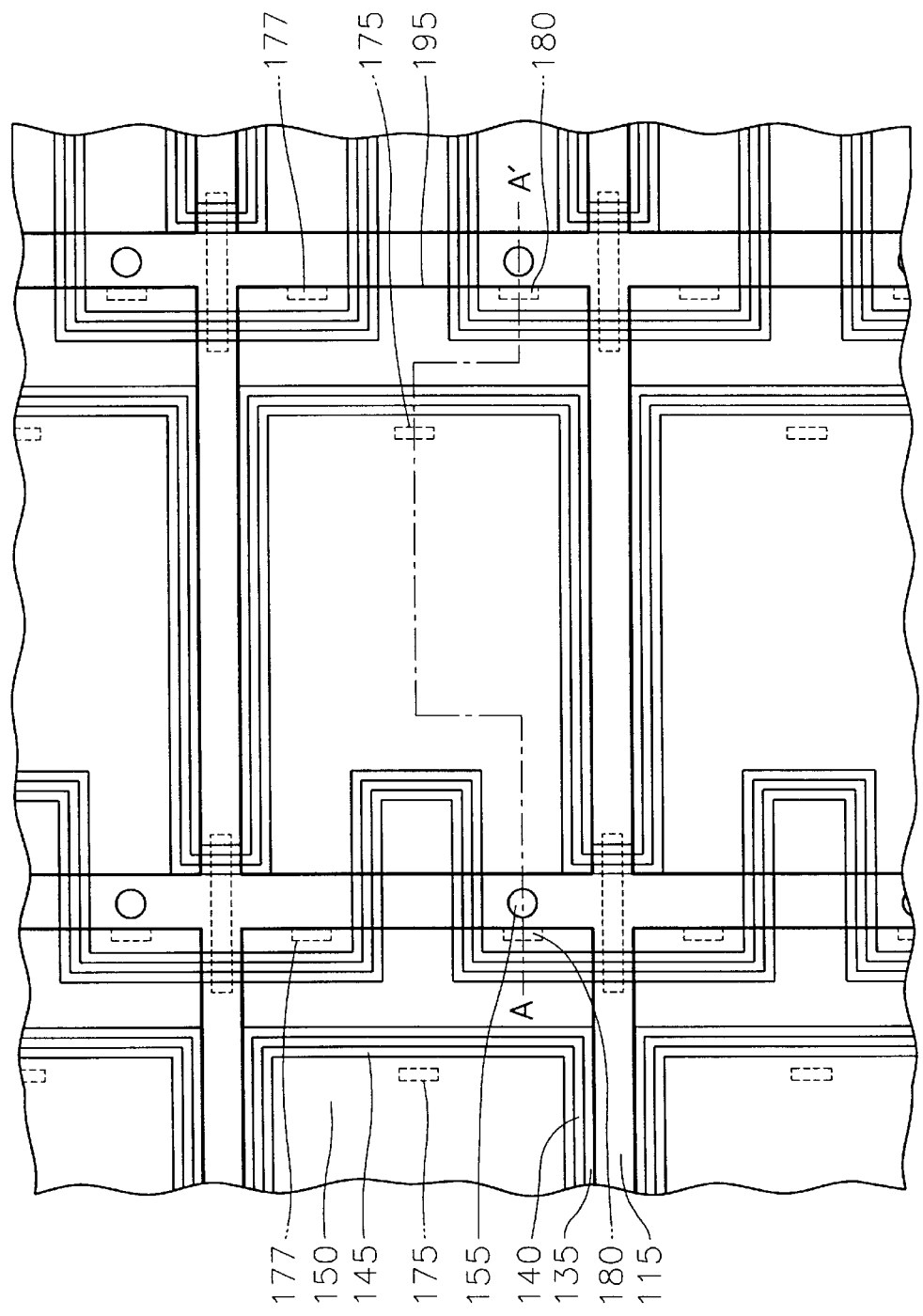
FIG. 4 is a plan view for showing a thin film AMA in an optical projection system according to the present invention.
Figure 5:
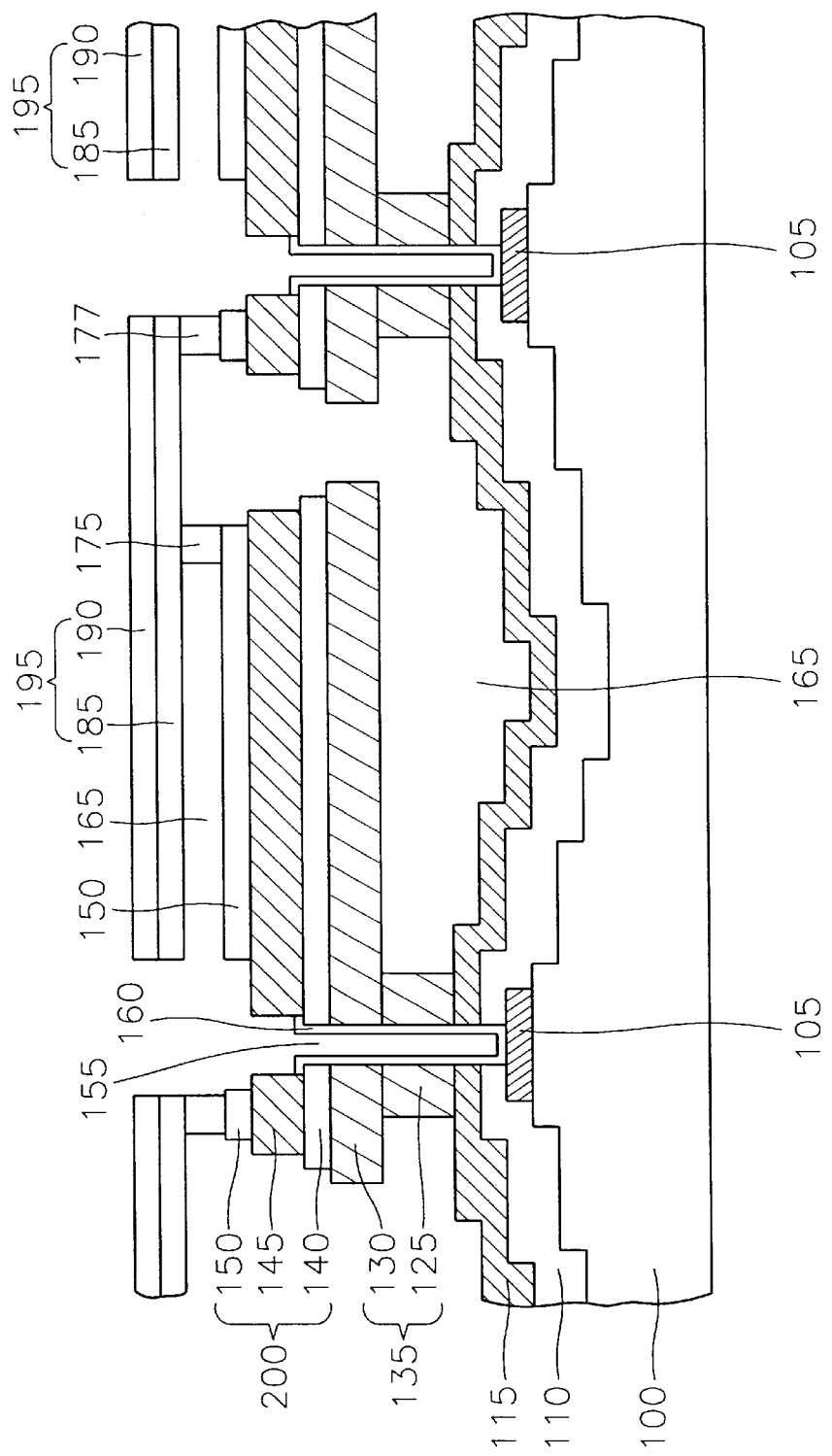
FIG. 5 is a cross-sectional view taken along line A—A' of FIG. 4.

FIG. 4 is a plan view for showing a thin film AMA in an optical projection system according to the present invention, and FIG. 5 is a cross-sectional view taken along line A—A' of FIG. 4.

Referring to FIGS. 4 and 5, the thin film AMA according to the present invention has a substrate 100, a supporting element 135 formed on the substrate 100, an actuator 170 formed on the supporting element 135 and a reflecting member 195 formed on the actuator 200.

The substrate 100 on which electrical wiring (not shown) is formed has a connecting terminal 105 formed on the electrical wiring, a passivation layer 110 overlaid on the substrate 100 and on the connecting terminal 105, and an etch stop layer 115 overlaid on the passivation layer 110. Preferably, the electrical wiring has a metal oxide semiconductor (MOS) transistor for switching operation.

The supporting element 135 has a supporting member 125 formed on the etch stop layer 115 under which the connecting terminal 105 is formed and a first supporting layer 130. The first supporting layer 130 has a first portion whose lower portion is attached to the supporting member 125 and a second portion formed parallel to and above the substrate 100. An air gap 165 is interposed between the substrate 100 and the second portion of the first supporting layer 130.

The actuator 200 has a bottom electrode 140 formed on the first supporting layer 130, an active layer 145 overlaid on the bottom electrode 140, and a top electrode 150 overlaid on the active layer 145. Moreover, the actuator 200 has a via hole 155 vertically formed from a portion of the active layer 145 to the connecting terminal 105, and has a via contact 160 formed in the via hole 155. The bottom electrode 140 is electrically connected to the connecting terminal 105 through the via contact 160.

Referring to FIG. 4, the actuator 200 has a 'U' shape. That is, the top electrode 150 has a 'U' shape, the active layer 145 also has a 'U' shape larger than the top electrode 150. Also, the bottom electrode 140 has a 'U' shape larger than the active layer 145.

Moreover, a first post 175 is formed in the middle of a first portion of the actuator, and a second post 177 and a third post 180 are correspondingly formed on both ends of an adjacent actuator having a 'U' shape. The first post 175, second post 177 and third post 180 are respectively located on the apexes of a triangle.

A first portion of the reflecting member 195 is supported by the first post 175, second post 177 and third post 180. An air gap 165 is interposed between a second portion of the reflecting member 195 and the top electrode 150 in such a manner that the second portion of the reflecting member 195 is formed parallel to the top electrode 150.

The reflecting member 195 has a second supporting layer 185 for enhancing a flatness of the reflecting member 195 and a reflecting layer 190 for reflecting a light. The lower portion of the second supporting layer 185 is supported by the first post 175, second post 177 and third post 180. So, a cross-sectional view of the first post 175, the second post 177 and the reflecting member 195 has an 'F' shape and a cross-sectional view of the first post 175, the third post 180 and the reflecting member 195 has an 'F' shape. The reflecting member 195 may have a rectangular shape.

A method for manufacturing the thin film AMA in an optical projection system according to the present invention will be described as follows.

FIGS. 6A to 6F illustrate manufacturing steps of the thin film AMA in an optical projection system illustrated in FIGS. 4 and 5. In FIGS. 6A to 6F, the same reference numbers are used for the same elements in FIGS. 4 and 5.

Figure 6A:
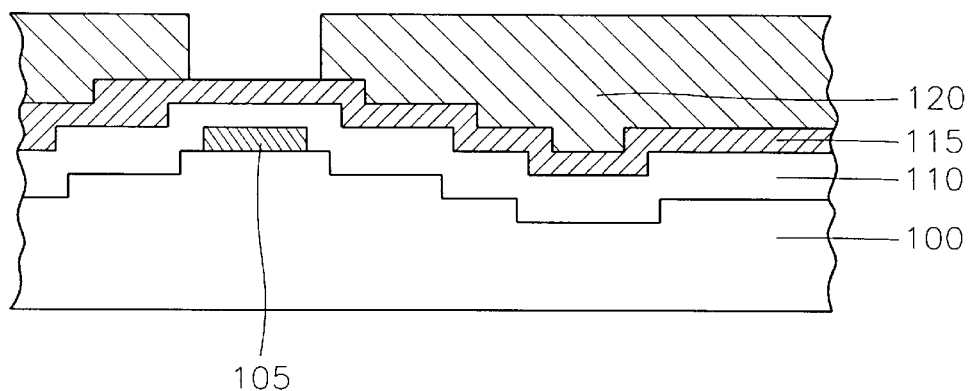

Referring to FIG. 6A, the connecting terminal 105 corresponding to the electrical wiring (not shown) is formed on the substrate 100. Preferably, the electrical wiring has a metal oxide semiconductor (MOS) transistor for switching operation. The connecting terminal 105 is formed by using metal such as tungsten (W). The connecting terminal 105 is electrically connected to the electrical wiring. The electrical wiring and the connecting terminal 105 receive a first signal from outside and transmit the first signal to the bottom electrode 140. The first signal is a picture signal.

The passivation layer 110 is overlaid on the connecting terminal 105 and on the substrate 100 by using phosphor-silicate glass (PSG). The passivation layer 110 is formed by a chemical vapor deposition (CVD) method so that the passivation layer 110 has a thickness of between about 0.8 $\mu$m and 1.0 $\mu$m. The passivation layer 110 protects the substrate 100 having the electrical wiring and the connecting terminal 105 during subsequent manufacturing steps.

The etch stop layer 115 is overlaid on the passivation layer 110 by using a nitride so that the etch stop layer 115 has a thickness of between about 1000 Å and 2000 Å. The etch stop layer 115 is formed by a low pressure chemical vapor deposition (LPCVD) method. The etch stop layer 115 protects the passivation layer 110 and the substrate 100 during successive etching steps.

A first sacrificial layer 120 is overlaid on the etch stop layer 115 by using PSG, metal, or oxide. The first sacrificial layer 120 is formed by an atmospheric pressure CVD (APCVD) method, a sputtering method, or an evaporation method so that the first sacrificial layer 120 has a thickness of between about 2.0 $\mu$m and 3.0 $\mu$m. The first sacrificial layer 120 makes easy the deposition of subsequent layers consisting of the actuator 200. In this case, the degree of flatness of the first sacrificial layer 120 is poor because the first sacrificial layer 120 covers the top of the substrate 100 having the electrical wiring and the connecting terminal 105. Therefore, the surface of the first sacrificial layer 120 is planarized by using a spin on glass (SOG) or by a chemical mechanical polishing (CMP) method. Next, a portion of the first sacrificial layer 120 under which the connecting terminal 105 is formed is patterned in order to expose a portion of the etch stop layer 115, thereby preparing a portion where the supporting member 125 of the actuator 200 is formed.

Figure 6B:
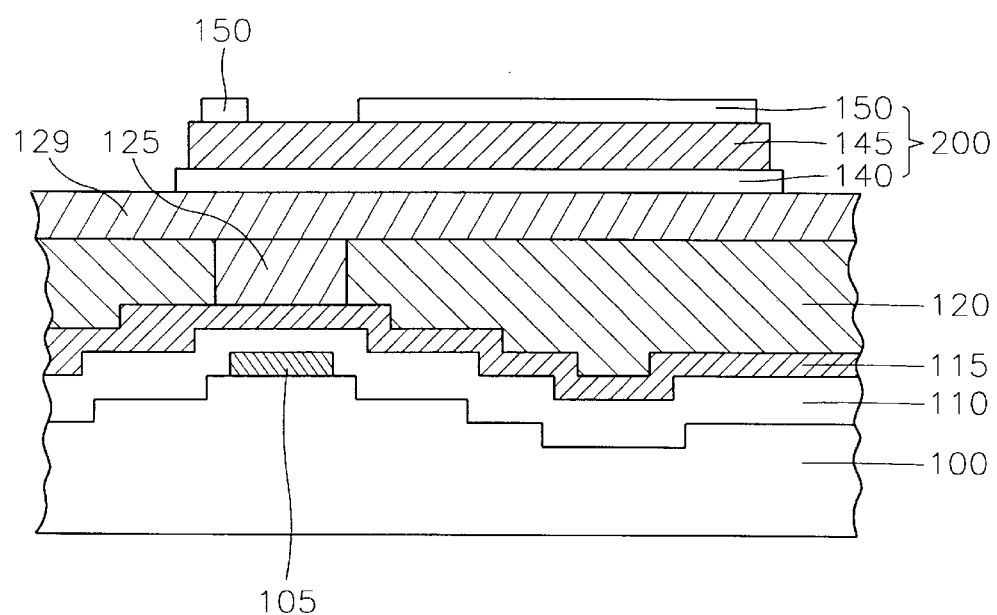

Referring to FIG. 6B, a first layer 129 is overlaid on the exposed etch stop layer 115 and on the first sacrificial layer 120 by using a rigid material, such as nitride or metal. The first layer 129 is formed by using an LPCVD method so that the first layer 129 has a thickness of between about 0.1 $\mu$m and 1.0 $\mu$m. At this time, the rigid material is overlaid on the first sacrificial layer 120 while filling the portion where the supporting member 125 of the actuator 200 is formed. Therefore, the supporting member 125 of the actuator 200 may be formed concurrently with the first layer 129 by using the same material as that of the first layer 129. The first layer 129 is patterned so as to form afterward the first supporting layer 130 having a predetermined pixel shape.

A bottom electrode layer 139 is overlaid on the first layer 129. The bottom electrode layer 139 is formed by using an electrically conductive metal such as platinum (Pt), tantalum (Ta), or a platinum-tantalum (Pt-Ta) alloy. The bottom electrode layer 139 is formed by a sputtering method or a CVD method so that the bottom electrode layer 139 has a thickness of between about 0.1 $\mu$m and 1.0 $\mu$m. Subsequently, an iso-cutting (that is isotropically cut) of the bottom electrode layer 139 is performed so as to apply the first signal to each pixel independently. The bottom electrode layer 139 is patterned so as to form the bottom electrode 140 afterward.

A second layer 144 is overlaid on the bottom electrode layer 139. The second layer 144 is formed by using a piezoelectric material such as ZnO, PZT (Pb(Zr, Ti)O$_3$), or PLZT ((Pb, La)(Zr, Ti)O$_3$) so that the second layer 144 has a thickness of between about 0.1 $\mu$m and 1.0 $\mu$m. Also, the second layer 144 can be formed by using an electrostrictive material such as PMN (Pb(Mg, Nb)O$_3$). After forming the second layer 144 by a sol-gel method, a sputtering method, or a CVD method, the second layer 144 is annealed by a furnace annealing method or by a rapid thermal annealing (RTA) method. The second layer 144 is patterned so as to form the active layer 145 afterward.

A top electrode layer 149 is overlaid on the second layer 144. The top electrode layer 149 is formed by using an electrically conductive metal, for example aluminum (Al), platinum, or silver (Ag). The top electrode layer 149 is formed by a sputtering method or a CVD method so that the top electrode layer 149 has a thickness of between about 0.1 $\mu$m and 1.0 $\mu$m.

After coating a photo resist (not shown) on the top electrode layer 149, the top electrode layer 149 is patterned in a 'U' shape by using the photo resist as an etching mask, thereby forming the top electrode 150. Then, the photo resist is removed. The second signal is applied to the top electrode 150 through a common line (not shown). The second signal is a bias signal.

The second layer 144 and the bottom electrode layer 139 are patterned by using the same method as that of the top electrode layer 149. The second layer 144 is patterned to form the active layer 145, and the bottom electrode layer 139 is patterned to form the bottom electrode 140. The active layer 145 has the same shape as that of the top electrode 150 and has a broader area than that of the top electrode 150. The bottom electrode 140 also has the same shape as that of the top electrode 150. The bottom electrode 140 has the same area or a broader area than that of the active layer 145.

Figure 6C:
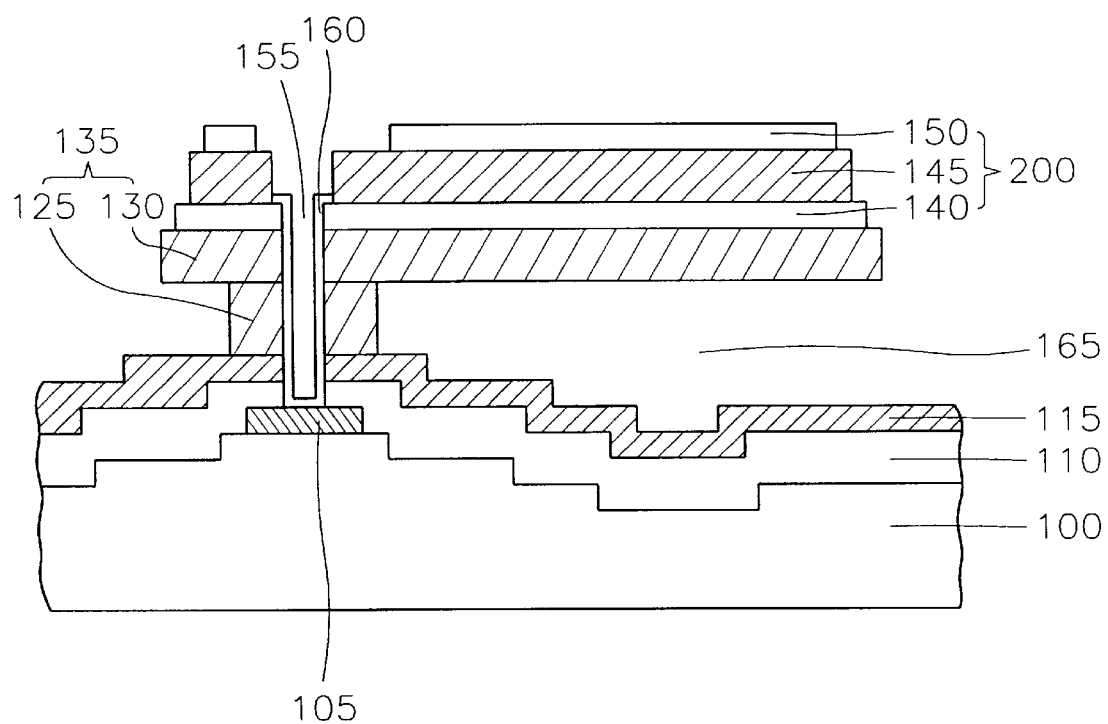

Referring to FIG. 6C, the via hole 155 is formed by etching a portion of the active layer 145, the bottom electrode 140, the first layer 129, the etch stop layer 115 and the passivation layer 110 in due order. Therefore, the via hole 155 is formed from a portion of the active layer 145 to an upper portion of the connecting terminal 105. Then, the via contact 160 is formed in the via hole 155 by using an electrically conductive metal, for example tungsten, aluminum or titanium. The via contact 160 is formed by a sputtering method and patterned. The via contact 160 electrically connects the connecting terminal 105 to the bottom electrode 140. So, the first signal applied from outside is applied to the bottom electrode 140 via the electrical wiring, the connecting terminal 105 and the via contact 160. Next, the first layer 129 is patterned to form the first supporting layer 130 having a predetermined pixel shape. In this case, the first supporting layer 130 has the same area or a broader area than that of the bottom electrode 140.

The first signal, which is the picture signal, is applied to the bottom electrode 140 via the electrical wiring, the connecting terminal 105 and the via contact 160. Therefore, when the first signal is applied to the bottom electrode 140, at the same time, the second signal is applied to the top electrode 150, an electric field is generated between the top electrode 150 and the bottom electrode 140. Thus, the active layer 145 is deformed by the electric field.

Next, the first sacrificial layer 120 is removed by using a vapor of hydrogen fluoride (HF). When the first sacrificial layer 120 is removed, the air gap 165 is formed at a position where the first sacrificial layer 120 had been positioned, and the actuator 200 is completed.

Figure 6D:
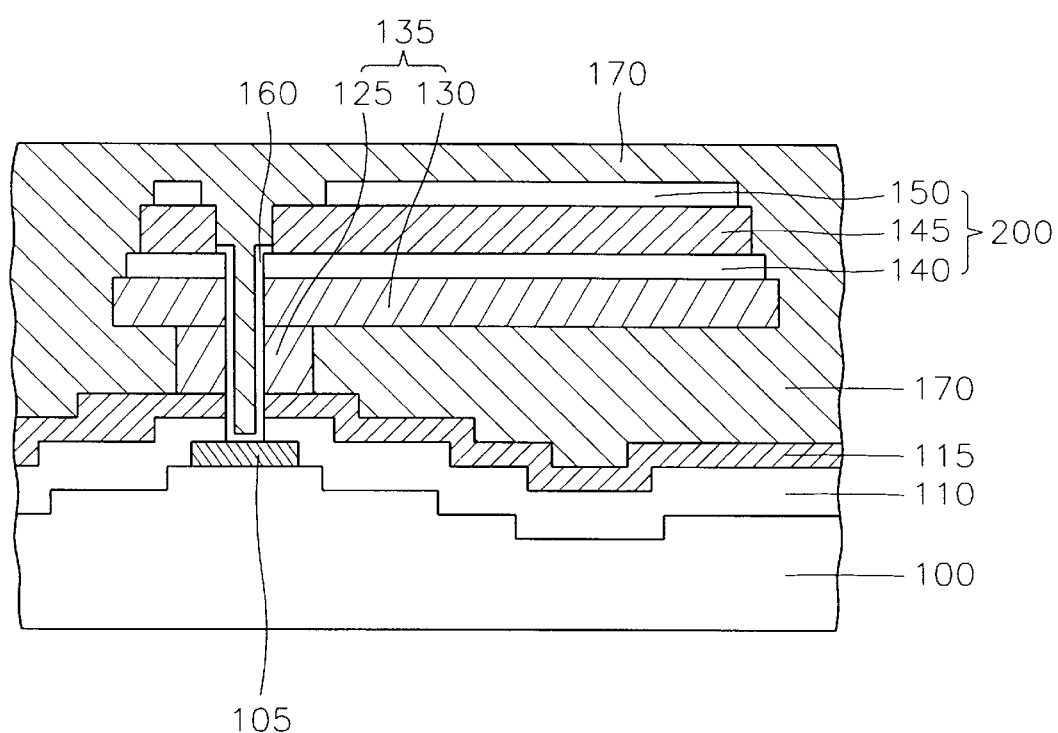

Referring to FIG. 6D, after the first sacrificial layer 120 is removed by using a vapor of hydrogen fluoride, a second sacrificial layer 170 is formed on the actuator 200 by using a material having fluidity such as polymer and by a spin coating method. The second sacrificial layer 170 makes easy the deposition of the reflecting member 195 and enhances the flatness of the reflecting member 195. The second sacrificial layer 170 is removed after the reflecting member 195 is formed. If the second sacrificial layer 170 is overlaid in this manner, the air gap 165 is perfectly filled and the second sacrificial layer 170 is formed to cover the top electrode 150.

Referring to FIG. 6E, the second sacrificial layer 170 is patterned to expose a first portion of the top electrode 150 and portions of the top electrode of an adjacent actuator correspondingly.

Next, the exposed first portion of the top electrode 150 is filled with an elastic material such as an aluminum alloy to form the first post 175. Also, the exposed portions of the top electrode of an adjacent actuator are filled with the same material as that of the first post 175 to form the second post 177 and the third post 180. Preferably, the first post 175, the second post 177 and the third post 180 are concurrently formed. Therefore, the first post 175, the second post 177 and the third post 180 are located on the apexes of a triangle. The first post 175, the second post 177 and the third post 180 support the reflecting member 195.

Then, the second supporting layer 185 is formed on the first post 175, the second post 177, the third post 180 and the second sacrificial layer 170. The second supporting layer 185 is formed by using a rigid material such as nitride or metal. The second supporting layer is formed by a sputtering method or a chemical vapor deposition method so that the second supporting layer 185 has a thickness of between about 0.1 μm and about 1.0 μm. The second supporting layer 185 has a function of supporting the reflecting member 195 during the reflecting member 185 is tilting. After that, the reflecting layer 190 is overlaid on the second supporting layer 185. The reflecting layer 190 is formed by using a reflective metal such as aluminum, platinum, or silver. The reflecting layer 190 is formed by a sputtering method or a chemical vapor deposition method so that the reflecting layer 190 has a thickness of between about 0.1 μm and about 1.0 μm.

Then, the reflecting layer 190 and the second supporting layer 185 are patterned simultaneously. At this time, a cross-sectional view of the first post 175, the second post 177 and the reflecting member 195 has an 'F' shape and a cross-sectional view of the first post 175, the third post 180 and the reflecting member 195 has an 'F' shape.

Figure 6F:
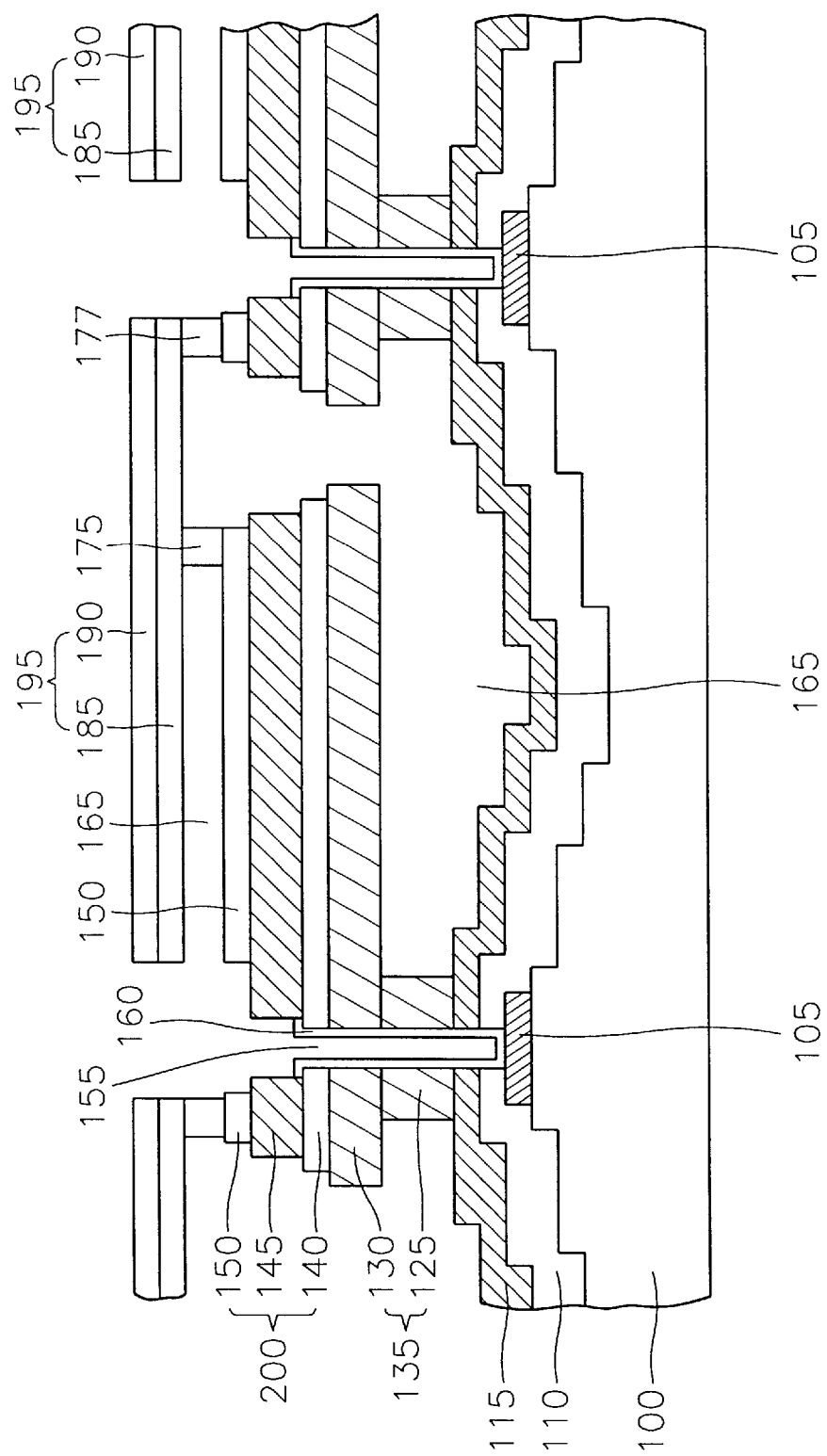

Referring to FIG. 6F, after forming the reflective member 195 as mentioned above, the second sacrificial layer 170 is removed to separate each pixel independently. Preferably, the second sacrificial layer 170 is removed by an oxygen plasma method. When the second sacrificial layer 170 is removed by etching, the actuator 200 and the reflecting member 195 are completed as shown in FIGS. 4 to 5. As it is described above, the flatness of the reflecting member 195 is enhanced because the reflecting member 195 is formed on the second sacrificial layer 170 composed of the material having fluidity.

The operation of the thin film AMA in an optical projection system according to the present invention will be described.

In the thin film AMA according to the present invention, the first signal, which is the picture signal, is applied to the bottom electrode 140 via the electrical wiring, the connecting terminal 105, and the via contact 160. At the same time, the second signal, which is the bias signal, is applied to the top electrode 150 from outside through the common line (not shown). Thus, an electric field is generated between the top electrode 150 and the bottom electrode 140. The active layer 145 formed between the top electrode 150 and the bottom electrode 140 is deformed by the electric field. The active layer 145 is deformed in a direction perpendicular to the electric field. Thus, the actuator 200 having the active layer 145 is actuated upward by a predetermined tilting angle.

Figure 7:
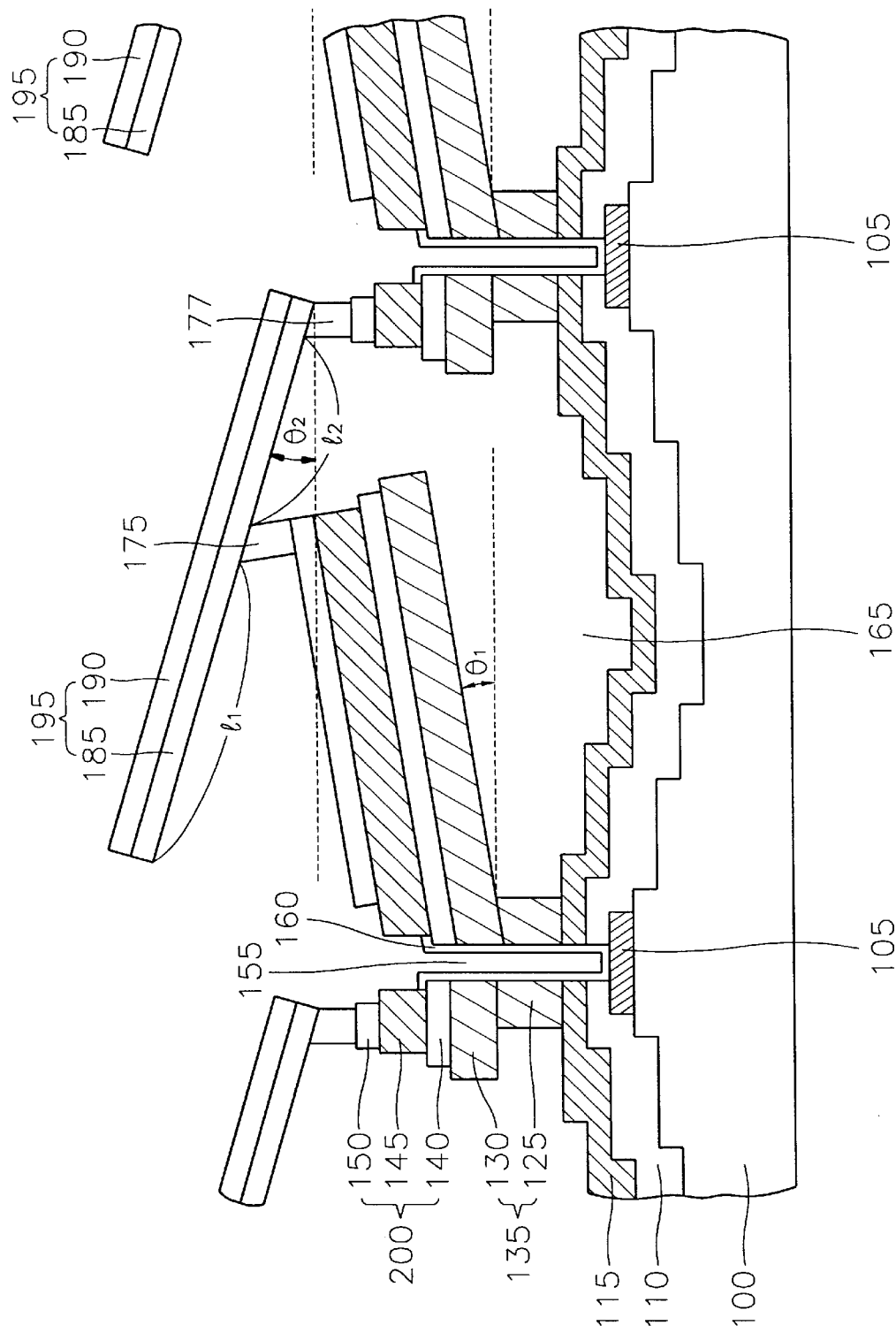
FIG. 7 is a cross-sectional view for showing a deformed state of the thin film AMA in an optical projection system illustrated in FIG. 5.

Referring to FIG. 7, if the tilting angle of the active layer 145 is $\theta_1$, the actuator 200 having the active layer 145 is actuated upward by a tilting angle of $\theta_1$. The reflecting member 195 for reflecting the incident light from the light source tilts by an angle of $\theta_1$ because the first post 175 for supporting the reflecting member 195 is formed on the top electrode 150 of the actuator 200. In this state, the reflecting member 195 is actuated upward by a tilting angle of $\theta_2$ because the reflecting member 195 is supported by the second post 177 and the third post 180 which are formed on the adjacent actuator. When the length of the reflecting member 195 from the first post 175 to an end of the reflecting member 195 is $l_1$ and when the length of the reflecting member 195 between the first post 175 and the second post 177 or between the first post 175 and the third post 180 is $l_2$, if $l_1$ is equal to $l_2$, $\theta_1$ is equal to $\theta_2$. Also, if $l_1$ is larger than $l_2$, $\theta_1$ is smaller than $\theta_2$ and if $l_1$ is smaller than $l_2$, $\theta_l$ is larger than $\theta_2$. That is, as the length of the reflecting member 195 between the first post 175 and the second post 177 or between the first post 175 and the third post 180 becomes shorter, the tilting angle of the reflecting member 195 becomes larger. The reflecting member 195 reflects the incident light from the light source, and the light reflected by the top electrode 155 passes a slit and forms a picture on a screen.

As the reflecting member 195 having the second supporting layer 185 and the reflecting layer 190 is supported by the first post 175, the second post 177 and the third post 180, an initial deflection or a tilt of the reflecting member 195 can be prevented. Therefore, the tilting angle of the reflecting member 195 installed on the actuator 200 can be made uniform.

Moreover, the length of the reflecting member 195 between the first post 175 and the second post 177 or between the first post 175 and the third post 180 can be short, so the tilting angle of the reflecting member 195 can be large, even though the thin film AMA has a small volume.

In the present invention, the first post 175 is formed in the middle of the first portion of the top electrode 150 and the second post and the third post are correspondingly formed each other on both ends of the adjacent actuator, so that the first post 175, the second post 177 and the third post 180 are respectively located on the apexes of a triangle.

Figure 8:
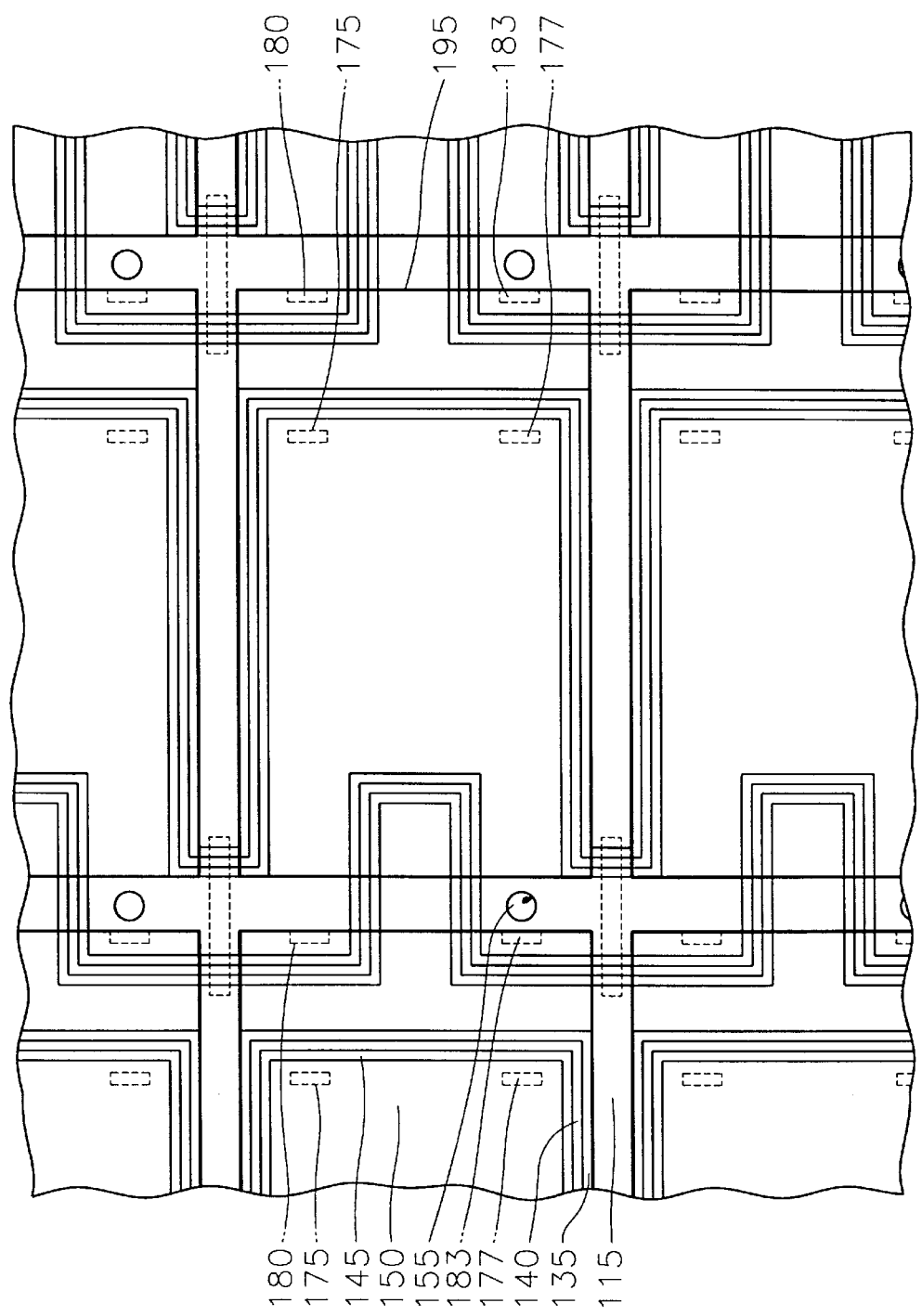
FIG. 8 is a plan view for showing another embodiment of the thin film AMA according to the present invention.

The present invention is not limited to this preferred embodiment, but four posts may be formed on the actuator for supporting the reflecting member as shown in FIG. 8. For example, a first post 175 and a second post 177 are correspondingly formed on a first portion of the actuator 200 according to the present invention. Also, a third post 180 and a fourth post 183 are correspondingly formed on a portion of an adjacent actuator under which the supporting member 125 is formed.

The actuator 200 may have a 'U' shape. In this case, the first post 175 and the second post 177 are correspondingly formed on the first portion of the actuator 200, and the third post 180 and the fourth post 183 are correspondingly formed on both ends of the adjacent actuator having a 'U' shape. Therefore, the first post 175, the second post 177, the third post 180 and the fourth post 183 are respectively located on the apexes of a tetragon. The first post 175, the second post 177, the third post 180 and the fourth post 183 respectively may be formed by using an elastic material. At this time, as the length of the reflecting member 195 between the first post 175 and the third post 180 becomes shorter than that of the reflecting member between the first post 175 and an end of the reflecting member, the tilting angle of the reflecting member 195 increases. In the same manner, as the length of the reflecting member 195 between the second post 177 and the fourth post 183 becomes shorter than that of the reflecting member 195 between the second post 177 and an end of the reflecting member 195, the tilting angle of the reflecting member 195 increases.

According to the present invention, a lower portion of the reflecting member is supported by a plurality of posts, thereby preventing an initial deflection or a tilt of the reflecting member. Therefore, the flatness of the reflecting member can be enhanced in such a manners that the tilting angles of every reflecting member can be uniform.

In addition, the length of the reflecting member 195 between the first post 175 and the second post 177 or between the third post 180 and the fourth post 183 can be short, so the tilting angle of the reflecting member 195 can be larger than that of the conventional thin film AMA, even though the thin film AMA has a small volume. Hence, the light efficiency of the light reflected by the reflecting member increases and the contrast of the picture projected onto a screen also increases. Furthermore, the distance between the light source and the screen is wider because the reflecting member has a large tilting angle.

Although preferred embodiment of the present invention has been described, it is understood that the present invention should not be limited to this preferred embodiment, but various changes and modifications can be made by one skilled in the art within the spirit and scope of the invention as hereinafter claimed.

What is claimed is:

1. A thin film actuated mirror array in an optical projection system being actuated by a first signal and a second signal, said thin film actuated mirror array comprising:
    a substrate having electrical wiring and a connecting terminal for receiving the first signal from outside and transmitting the first signal;
    a supporting element having a supporting member formed on said substrate where said connecting terminal is formed and a first supporting layer, said first supporting layer having a first portion attached to said supporting member and a second portion formed parallel to said substrate;
    an actuator having a bottom electrode formed on said first supporting layer for receiving the first signal, a top electrode corresponding to said bottom electrode for receiving the second signal and generating an electric field between said top electrode and said bottom electrode, and an active layer formed between said top electrode and said bottom electrode and deformed by the electric field;
    a first post formed on a first portion of said actuator;
    a second post and a third post formed on an actuator adjacent to said actuator where said supporting member is formed, said second post and said third post being formed corresponding to each other; and
    a reflecting means for reflecting a light, said reflecting means being supported by said first post, said second post and said third post.

2. The thin film actuated mirror array in an optical projection system as claimed in claim 1, wherein said actuator has a 'U' shape, said first post is formed in the middle of the first portion of said actuator, and said second post and said third post are correspondingly formed on both ends of said adjacent actuator having a 'U' shape.

3. The thin film actuated mirror array in an optical projection system as claimed in claim 1, wherein said first post, said second post and said third post are respectively formed by using an elastic material.

4. The thin film actuated mirror array in an optical projection system as claimed in claim 1, wherein said first post is formed in the middle of the first portion of said actuator and said second post and said third post are correspondingly formed each other on both ends of said adjacent actuator, in such a manner that said first post, said second post and said third post are respectively located on the apexes of a triangle.

5. The thin film actuated mirror array in an optical projection system as claimed in claim 1, wherein a cross-sectional view of said first post, said second post and said reflecting means has an 'F' shape and a cross-sectional view of said first post, said third post and said reflecting means has an 'F' shape.

6. The thin film actuated mirror array in an optical projection system as claimed in claim 1, wherein the length of said reflecting means between said first post and said second post is shorter than that of said reflecting means between said first post and an end of said reflecting means, and the length of said reflecting means between said first post and said third post is shorter than that of said reflecting means between said first post and an end of said reflecting means.

7. The thin film actuated mirror array in an optical projection system as claimed in claim 1, wherein said reflecting means has a second supporting layer supported by said first post, said second post and said third post, and has a reflecting layer formed on said second supporting layer for reflecting a light, said second supporting layer enhancing a flatness of said reflecting means.

8. A thin film actuated mirror array in an optical projection system being actuated by a first signal and a second signal, said thin film actuated mirror array comprising:
- a substrate having electrical wiring and a connecting terminal for receiving the first signal from outside and transmitting the first signal;
- a supporting element having a supporting member formed on said substrate where said connecting terminal is formed and a first supporting layer, said first supporting layer having a first portion attached to said supporting member and a second portion formed parallel to said substrate;
- an actuator having a bottom electrode formed on said first supporting layer for receiving the first signal, a top electrode corresponding to said bottom electrode for receiving the second signal and generating an electric field between said top electrode and said bottom electrode, and an active layer formed between said top electrode and said bottom electrode and deformed by the electric field, said actuator having a 'U' shape;
- a first post formed in the middle of a first portion of said actuator;
- a second post and a third post correspondingly formed on both ends of said adjacent actuator having a 'U' shape; and
- a reflecting means for reflecting a light, said reflecting means being supported by said first post, said second post and said third post.

9. The thin film actuated mirror array in an optical projection system as claimed in claim 8, wherein said first post, said second post and said third post are respectively formed by using an elastic material, and said first post, said second post and said third post are respectively located on the apexes of a triangle.

10. The thin film actuated mirror array in an optical projection system as claimed in claim 8, wherein a cross-sectional view of said first post, said second post and said reflecting means has an 'F' shape and a cross-sectional view of said first post, said third post and said reflecting means has an 'F' shape.

11. The thin film actuated mirror array in an optical projection system as claimed in claim 8, wherein the length of said reflecting means between said first post and said second post is shorter than that of said reflecting means between said first post and an end of said reflecting means, and the length of said reflecting means between said first post and said third post is shorter than that of said reflecting means between said first post and an end of said reflecting means.

12. A thin film actuated mirror array in an optical projection system being actuated by a first signal and a second signal, said thin film actuated mirror array comprising:
- a substrate having electrical wiring and a connecting terminal for receiving the first signal from outside and transmitting the first signal;
- a supporting element having a supporting member formed on said substrate where said connecting terminal is formed and a first supporting layer, said first supporting layer having a first portion attached to said supporting member and a second portion formed parallel to said substrate;
- an actuator having a bottom electrode formed on said first supporting layer for receiving the first signal, a top electrode corresponding to said bottom electrode for receiving the second signal and generating an electric field between said top electrode and said bottom electrode, and an active layer formed between said top electrode and said bottom electrode and deformed by the electric field;
- a first post and a second post correspondingly formed on a first portion of said actuator;
- a third post and a fourth post formed on an actuator adjacent to said actuator where said supporting member is formed, said third post and said fourth post being formed corresponding to each other; and
- a reflecting means for reflecting a light, said reflecting means being supported by said first post, said second post, said third post and said fourth post.

13. The thin film actuated mirror array in an optical projection system as claimed in claim 12, wherein said actuator has a 'U' shape, said first post and said second post are correspondingly formed on the first portion of said actuator, and said third post and said fourth post are correspondingly formed on both ends of said adjacent actuator having a 'U' shape.

14. The thin film actuated mirror array in an optical projection system as claimed in claim 12, wherein said first post, said second post, said third post and said fourth post are respectively formed by using an elastic material, and said first post, said second post, said third post and said fourth post are respectively located on the apexes of a tetragon.

15. The thin film actuated mirror array in an optical projection system as claimed in claim 12, wherein the length of said reflecting means between said first post and said third post is shorter than that of said reflecting means between said first post and an end of said reflecting means, and the length of said reflecting means between said second post and said fourth post is shorter than that of said reflecting means between said second post and an end of said reflecting means.

16. A method for manufacturing a thin film actuated mirror array in an optical projection system being actuated by a first signal and a second signal, said method comprising the steps of:
- providing a substrate having electrical wiring and a connecting terminal for receiving the first signal from outside and transmitting the first signal;
- forming a first sacrificial layer on said substrate and patterning said first sacrificial layer to expose a portion of said substrate where said connecting terminal is formed;
- forming a first layer on said exposed substrate and on said first sacrificial layer;
- forming a bottom electrode layer, a second layer and a top electrode layer successively on said first layer;
- forming an actuator by patterning said top electrode layer to form a top electrode for receiving the second signal and generating an electric field, by patterning said second layer to form an active layer deformed by the electric field, and by patterning said bottom electrode layer to form a bottom electrode for receiving the first signal;
- forming a supporting element by patterning said first layer to form a first supporting layer beneath said bottom electrode, and by forming a supporting member under a first portion of said first supporting layer;
- forming a second sacrificial layer on said actuator and on an actuator adjacent to said actuator and patterning said second sacrificial layer to expose a first portion of said actuator and to expose portions of said adjacent actuator correspondingly where said supporting member is formed;

forming a first post in the exposed first portion of said actuator;

forming a second post and a third post in the exposed portions of said adjacent actuator; and forming a reflecting means on said first post, said second post, said third post and said second sacrificial layer for reflecting a light.

17. The method for manufacturing the thin film actuated mirror array in an optical projection system as claimed in claim 16, wherein the step of forming said first post and the step of forming said second post and said third post are concurrently performed.

18. The method for manufacturing the thin film actuated mirror array in an optical projection system as claimed in claim 16, wherein the step of forming said reflecting means further comprises the step of forming a second supporting layer on said first post, said second post, said third post and said second sacrificial layer, forming a reflecting layer on said second supporting layer, patterning said reflecting layer and said second supporting layer, and removing said second sacrificial layer.

19. The method for manufacturing the thin film actuated mirror array in an optical projection system as claimed in claim 18, wherein the step of forming said second supporting layer is performed by using nitride or metal and by a sputtering method or a chemical vapor deposition method.

20. The method for manufacturing the thin film actuated mirror array in an optical projection system as claimed in claim 18, wherein the step of removing said second sacrificial layer is performed by an oxygen plasma method.

* * * * *